(No Model.)
W. H. DAYTON.
MACHINE FOR MAKING TUBES.
No. 434,431. Patented Aug. 19, 1890.
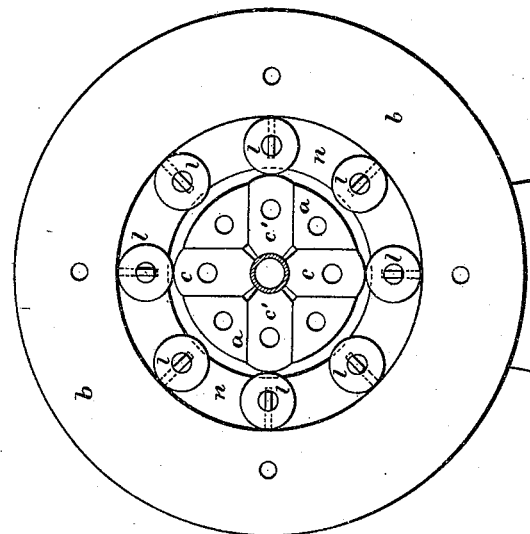
Fig. 2.
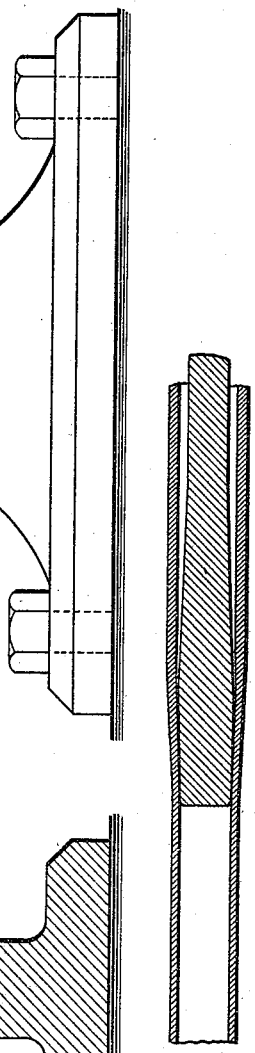
Fig. 3.
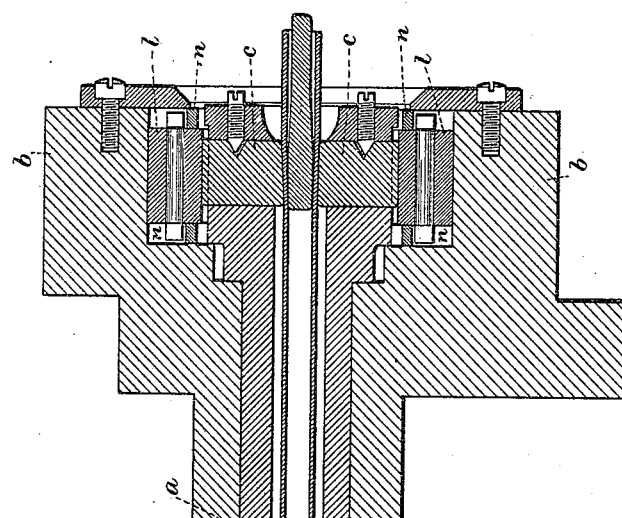
Fig. 1.
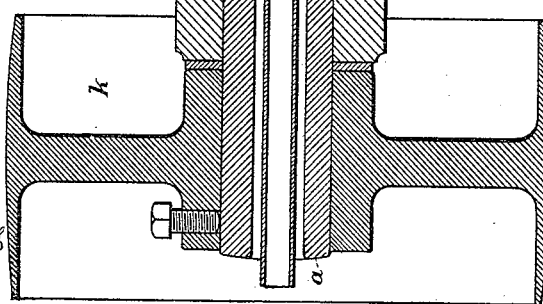
Witnesses:
J. Staib
Chas. H. Smith
Inventor:
William H. Dayton
per Lemuel W. Serrell
Atty.

UNITED STATES PATENT OFFICE.

WILLIAM H. DAYTON, OF TORRINGTON, CONNECTICUT.

MACHINE FOR MAKING TUBES.

SPECIFICATION forming part of Letters Patent No. 434,431, dated August 19, 1890.

Application filed December 2, 1889. Serial No. 332,212. (No model.)

*To all whom it may concern:*

Be it known that I, WILLIAM H. DAYTON, of Torrington, in the county of Litchfield and State of Connecticut, have invented an Improvement in the Manufacture of Metallic Tubes, of which the following is a specification.

In Letters Patent No. 268,874, granted to me December 12, 1882, a machine is shown for swaging needle-blanks and other cylindrical articles, in which the swaging-dies are across the end of the tubular shaft and the ends of the dies come into contact with rollers within a circular head or shell.

In the manufacture of metallic tubes, especially copper and brass, the tube has been reduced by drawing it through a stationary die, and in some cases there has been a mandrel within the pipe while it is drawn; but great power is required, and it is difficult to remove the tube from the mandrel.

In my improvements I am able to reduce the metallic tube in diameter and to either thicken the metal at the same time or to render it thinner and to elongate the tube, as desired, and I am able to make use of a mandrel and prevent the tube becoming so firmly tightened around the same as to be difficult of removal.

I have discovered that my machine, patented as aforesaid, with some additions and modifications, is capable of reducing and elongating metallic tubing in a manner that involves a novel and highly-useful process or mode of operation that at the same time renders the tube much stronger and more uniform in quality and density than the wrought-metal pipes heretofore made.

In the drawings, Figure 1 is a longitudinal section of my apparatus. Fig. 2 is an elevation with the retaining-rings removed. Fig. 3 is a section, in larger size, of the tube that is operated upon.

The tubular shaft $a$, driving-pulley $k$, circular shell $b$, and circular range of rollers $l$ are similar to those shown in my aforesaid patent, except in the particulars hereinafter set forth. When there are but two dies $c\ c$ for acting upon the cylindrical article, as in my aforesaid Letters Patent, the reduction is not as rapid or as perfect as it is when two or three pairs of dies are introduced to act upon the article, especially in cases where a tube of large size is being manufactured, because said two or three pairs of dies, acting simultaneously around the circumference, prevent the metal springing out laterally, and also facilitate the separation of the dies from the article, for where the die-faces are nearly semicircular they are liable to become more or less wedged upon the tube by the powerful pressure made use of.

There are two pairs of dies $c\ c$ and $c'\ c'$ shown. They stand radially in slots around the head of the tubular shaft $a$, and there is a circular range of eight, ten, twelve, or more rollers $l$ around the head of the shaft $a$ and within the shell $b$, and the axes of these rollers $l$ are in rings $n$, that are carried around gradually as the rollers are revolved by the revolution of the shaft $a$ and the dies $c\ c'$ striking against said rollers.

When there are two pairs of dies, the edges of the die-blocks adjacent to the quarter-circle recesses of the face do not stand at an angle of forty-five degrees to a plane through the center of the die, but at an angle of about forty degrees, so that when the pairs of dies are forced inwardly the dies may touch each other, or nearly so, at the edges of the quarter-circle recesses; but there will be openings between the dies, which diverge or become wider at a distance from the article operated upon. This allows a space for the reception of any particles of metal or scale, and such particles work out and fall away, instead of becoming wedged in between the surfaces of the dies as they approach each other. If there are three or more pairs of dies, similar diverging openings will be provided between the adjacent dies, but the angles will be different from those before named. It is now to be understood that when two or three pairs of dies are brought up simultaneously, or nearly so, upon opposite sides of a cylindrical article, such article is squeezed or compressed with uniformity, the pressure acting nearly all around it, and hence the article is reduced in diameter and elongated, the reduction and compression being always in the direction of the radii, or nearly so. Thereby the molecular structure of the metal is not injured, and much greater reduction can be effected without annealing than is possible in swaging-machines employing only two dies, and the cylindrical article cannot become wedged into the quarter-circle recesses in the faces of the dies.

When this improvement is made use of in the manufacture of tubes, the ingot may be cast or otherwise formed of any desired size with a central hole through the same, and then the ingot is passed through the before-described machine for compressing the metal and elongating the tube, or it may be forged, rolled, or otherwise worked before reaching my improved swaging-machine. When it is operated upon by my said swaging-machine, the compression takes place peripherally and toward the center of the tube to elongate the tube and reduce the same in diameter. If there is no core or mandrel within the tube while the same is being operated upon, the tube may be increased in thickness in the act of compressing the same to a smaller diameter, or the tube may be elongated without increasing the thickness of the metal, according to the condition of the metal operated upon; but where a core or mandrel is introduced at the proper stage of the successive reductions the same will maintain the proper internal diameter of the tube, and the reduction of the metal will be uniform and the quality of the metal will correspond to that of rolled plate, the extension of the metal taking place in the direction of the length of the tube.

It is preferable to make use of a core or mandrel that is stationary, because the revolving shaft and dies by grasping the tube and compressing it will also give to the tube a rotary movement around the mandrel, thereby preventing the interior of the tube adhering to the mandrel and lessening the force required to move the tube along upon the mandrel and in between the dies, thereby imparting to the interior of the tube a perfection of finish that cannot be obtained in either rolled or drawn tubes, and there is no risk of the tube splitting lengthwise, because the dies compress the metal and tend to close up any flaws or imperfections in the ingot.

I do not claim dies in pairs, actuated either simultaneously or successively. Neither do I herein claim a range of rollers within a cylindrical head acting in succession upon a pair of dies, as these have before been made use of.

I claim as my invention—

1. The combination, with a revolving tubular shaft having at one end a head with slots across the same, of pairs of dies within such slots, a stationary shell surrounding the dies and having a circular interior surface, and a range of rollers between the inner surface of the shell and the outer ends of the dies and acting upon such dies simultaneously for pressing them inwardly upon the article to be swaged, substantially as set forth.

2. The tubular shaft A, having radial slots or mortises across its end and dies within such mortises and in pairs opposite to each other, each die having a segmental recess in its inner face and the edges of the dies beveled at less than a right angle to leave diverging openings between the respective dies for the escape of particles of metal, and mechanism for forcing the pairs of dies inwardly simultaneously to swage the article inserted between them, substantially as set forth.

3. The combination, in machinery for making metal tubes, of a mandrel held in a fixed position, two pairs of dies with segmental faces placed radially, a revolving head for supporting and rotating the dies around the tube, and means for closing the dies simultaneously, whereby the dies act to compress the tube and reduce it in thickness and simultaneously to turn the tube on the mandrel, substantially as specified.

Signed by me this 20th day of November, A. D. 1889.

WILLIAM H. DAYTON.

Witnesses:
HENRY WATSON,
JOHN W. BROOKS.